United States Patent
Lin et al.

(10) Patent No.: US 11,254,238 B2
(45) Date of Patent: Feb. 22, 2022

(54) OCCUPANT POSITION DETECTION WITH ACTIVE ELECTRIC FIELD SENSOR

(71) Applicant: Ford Global Technologies, LLC, Dearborn, MI (US)

(72) Inventors: Jun Lin, Westland, MI (US); Jialiang Le, Canton, MI (US); Hubert Szawarski, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 16/571,851

(22) Filed: Sep. 16, 2019

(65) Prior Publication Data
US 2021/0078447 A1    Mar. 18, 2021

(51) Int. Cl.
| | |
|---|---|
| *B60N 2/00* | (2006.01) |
| *G01V 3/08* | (2006.01) |
| *B60R 16/023* | (2006.01) |
| *B60R 21/015* | (2006.01) |

(52) U.S. Cl.
CPC ............ *B60N 2/002* (2013.01); *B60R 16/023* (2013.01); *B60R 21/015* (2013.01); *G01V 3/088* (2013.01); *B60R 21/01512* (2014.10); *B60R 21/01532* (2014.10)

(58) Field of Classification Search
CPC ........ B60R 21/01532; B60R 21/01552; B60R 21/015; B60R 21/01542; B60R 16/023; B60R 21/01512; B60N 2/002; G01V 3/088
See application file for complete search history.

(56) References Cited

U.S. PATENT DOCUMENTS

| | | |
|---|---|---|
| 5,964,478 A | 10/1999 | Stanley et al. |
| 6,378,900 B1 | 4/2002 | Stanley et al. |
| 6,609,055 B2 | 8/2003 | Stanley |
| 8,725,311 B1 | 5/2014 | Breed |
| 9,082,239 B2 | 6/2015 | Ricci |
| 9,751,534 B2 | 9/2017 | Fung et al. |
| 2012/0126519 A1* | 5/2012 | Ohara .............. B60R 21/01516 280/735 |
| 2019/0390982 A1* | 12/2019 | Oel ...................... G01D 18/001 |

FOREIGN PATENT DOCUMENTS

KR        101420236 B1    7/2014

* cited by examiner

*Primary Examiner* — Amy He
(74) *Attorney, Agent, or Firm* — David Coppiellie; Price Heneveld LLP (57) ABSTRACT

A vehicle seating assembly comprises a seat including a back having an array of at least two electrodes arranged in the back such that a master electrode has an electric field being greater than an electric field of each of the other electrodes within the array to detect a total change in capacitance from the array. A controller is responsive to a change in capacitance calculated from the master electrode being greater than a first threshold and each of the other electrodes in the array being greater than a second threshold and outputs occupant movement data indicative of a first status of the seat to a vehicle control sub-system.

14 Claims, 7 Drawing Sheets

OCCUPANT POSITION DETECTION WITH ACTIVE ELECTRIC FIELD SENSOR

FIELD OF THE DISCLOSURE

The present invention generally relates to seating assemblies for vehicles. In particular, the present disclosure is directed toward determining a status of a seating assembly in a vehicle.

BACKGROUND OF THE DISCLOSURE

Currently, vehicle seating assemblies may include pressure sensors distributed about a base of the seating assembly. The pressure sensor provides data indicative of occupant weight, which can be used to calculate other occupant features such as height and type, for example, an adult or a child occupant. For example, the pressure sensors of the seating assembly may be distributed across a surface area of the base to measure a pressure change indicative of a presence of an occupant. This pressure distribution across the surface area of the seat base provides a controller data sufficient to calculate occupant characteristics, such as weight or type. Stated differently, a child occupant may have a different pressure distribution across the pressure sensors than an adult occupant such that a controller calculates and compares the pressure distribution to a threshold to provide data indicative of an occupant characteristic.

SUMMARY OF THE DISCLOSURE

According to one aspect of the present disclosure, a vehicle seating assembly comprises a seat including a back having an array of at least two electrodes arranged in the back such that a master electrode has an electric field being greater than an electric field of each of the other electrodes within the array to detect a total change in capacitance from the array.

According to another aspect of the present disclosure, a vehicle comprises a seating assembly having a plurality of electrodes disposed in an array, and includes a master electrode having an electric field being greater than each of the other electrodes in the plurality of electrodes and a controller, responsive to a change in capacitance calculated from the master electrode being greater than a second threshold and each of the other electrodes in the plurality of electrodes being greater than a first threshold, that outputs occupant movement data indicative of a first status of the seat.

According to yet another aspect of the present disclosure, a method for controlling a vehicle sub-system comprises receiving, from a seating assembly having a plurality of electrodes including a master electrode having an electric field being greater than each of the other electrodes in the plurality of electrodes being disposed in an array in a back portion of the seating assembly, occupant movement data; calculating, via a controller, a status of the seating assembly based on a change in capacitance calculated from the master electrode being greater than a second threshold and a change in capacitance from each of the other electrodes in the plurality of electrodes being greater than a first threshold; and transmitting the status of the seating assembly to a vehicle control sub-system.

Embodiments of the first aspect of the invention can include any one or a combination of the following features:
 a seat including a back;
 an array of at least two electrodes arranged in the back such that a master electrode has an electric field being greater than an electric field of each of the other electrodes within the array to detect a total change in capacitance from the array;
 a controller that outputs occupant movement data indicative of a status of the seat if the total change in capacitance is greater than a first threshold;
 the controller transmits the status to a vehicle control sub-system;
 the controller outputs occupant movement data being indicative of a second status of the seat if the master electrode has a change in capacitance being less than a second threshold and each of the other electrodes has a change in capacitance being less than the first threshold;
 the first status of the seat is indicative of the master electrode having a change in capacitance being greater than the second threshold and each of the other electrodes having a change in capacitance being greater than the first threshold;
 the controller outputs occupant movement data being indicative of a third status of the seat if at least one electrode disposed on a first side of the array of the plurality of electrodes has a change in capacitance being greater than a change in capacitance of at least one electrode disposed on a second side of the array of the plurality of electrodes;
 the controller outputs occupant movement data being indicative of a fourth status of the seat if at least one electrode disposed on a first side of the array of the plurality of electrodes has a change in capacitance being less than a change in capacitance of at least one electrode disposed on a second side of the array of the plurality of electrodes;
 a seating assembly;
 a plurality of electrodes disposed in an array, and including a master electrode having an electric field being greater than each of the other electrodes in the plurality of electrodes;
 a controller that outputs occupant movement data indicative of a first status of the seat if a change in capacitance calculated from the master electrode is greater than a second threshold and each of the other electrodes in the plurality of electrodes has a change in capacitance greater than a first threshold;
 the plurality of electrodes is arranged asymmetrically across a seating assembly centerline;
 the controller outputs occupant movement data being indicative of a second status of the seat if the master electrode has a change in capacitance being less than the second threshold and each of the other electrodes has a change in capacitance being less than the first threshold;
 the controller outputs occupant movement data being indicative of a third status of the seat if at least one electrode disposed on a first side of the array of the plurality of electrodes has a change in capacitance being greater than a change in capacitance of at least one electrode disposed on a second side of the array of the plurality of electrodes;
 the controller outputs occupant movement data being indicative of a fourth status of the seat if at least one electrode disposed on a first side of the array of the plurality of electrodes has a change in capacitance being less than a change in capacitance of at least one electrode disposed on a second side of the array of the plurality of electrodes;

the first and second sides of the array are oppositely orientated across the vertical centerline;

the plurality of electrodes is arranged symmetrically across a seat centerline;

a vehicle sub-system;

receiving, from a seating assembly having a plurality of electrodes including a master electrode having an electric field being greater than each of the other electrodes in the plurality of electrodes being disposed in an array in a back portion of the seating assembly, occupant movement data;

calculating, via a controller, a status of the seating assembly based on a change in capacitance calculated from the master electrode being greater than a second threshold and a change in capacitance from each of the other electrodes in the plurality of electrodes being greater than a first threshold;

transmitting the status of the seating assembly to a vehicle control sub-system;

calculating, via the controller, responsive to the master electrode having a change in capacitance being less than the second threshold and each of the other electrodes having a change in capacitance being less than the first threshold, occupant movement data being indicative of a second status of the seating assembly;

calculating, via the controller, responsive to at least one electrode disposed on a first side of the array of the plurality of electrodes having a change in capacitance being greater than a change in capacitance of at least one electrode disposed on a second side of the array of the plurality of electrodes, occupant movement data being indicative of a third status of the seating assembly;

calculating, via the controller, responsive to at least one electrode disposed on a first side of the array of the plurality of electrodes having a change in capacitance being less than a change in capacitance of at least one electrode disposed on a second side of the array of the plurality of electrodes, occupant movement data being indicative of a fourth status of the seat;

transmitting the status of the seating assembly to at least one additional vehicle control sub-system; and the second threshold is greater than the first threshold.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
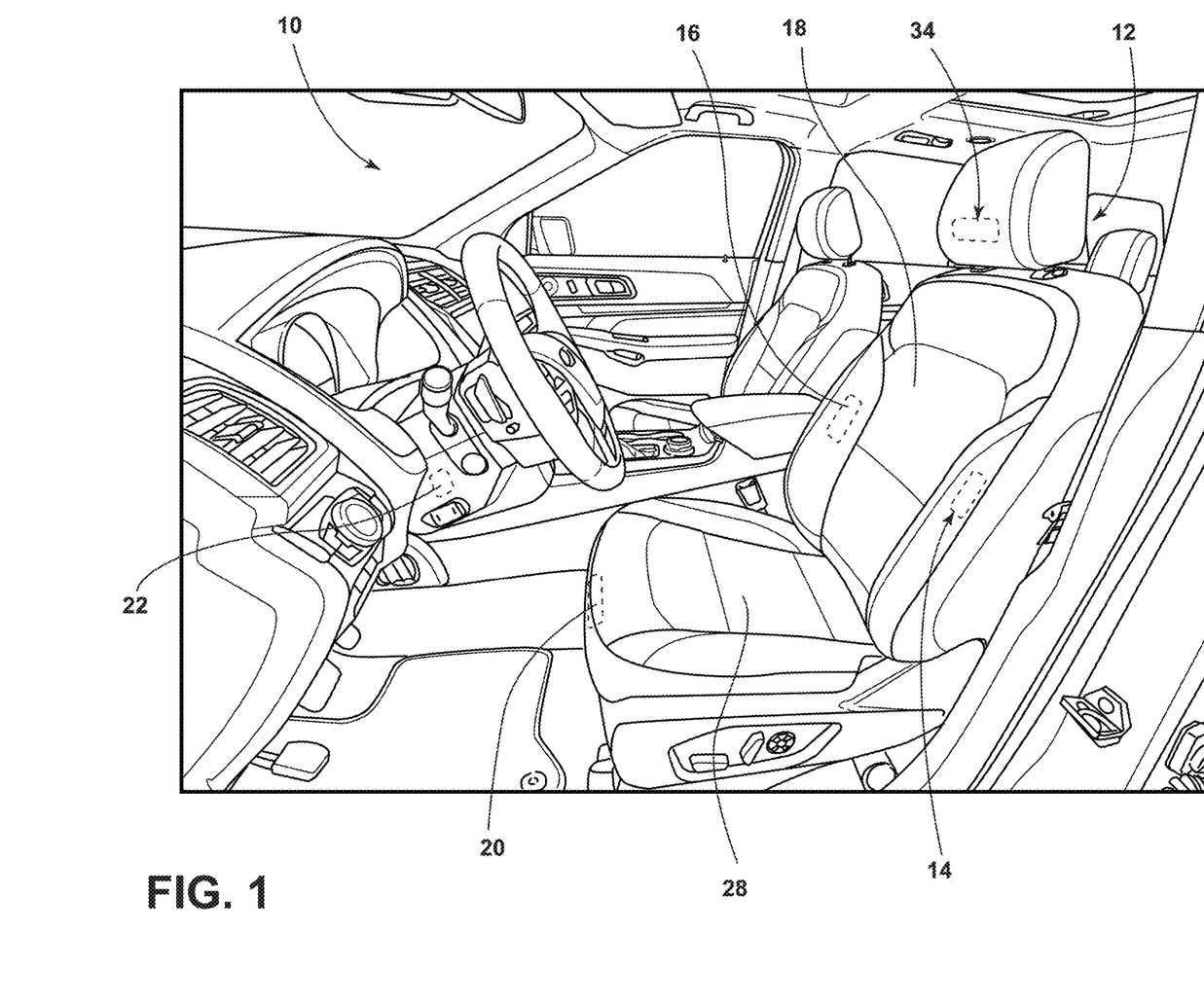
FIG. 1 is a schematic, perspective view of a vehicle having a seating assembly with an array of electrodes to detect a change in capacitance of the seating assembly.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations.

FIG. 1 depicts a schematic, perspective view of an interior of a vehicle 10 including a seating assembly 12 having an array 14 of electrodes 16 disposed in a back 18 of the vehicle seating assembly 12. A controller 20 calculates a status of the seating assembly 12 based on a change in capacitance between the electrodes 16 in the array 14. For example, applying a voltage to the array 14 of electrodes 16 creates an electric field at each of the electrodes 16 such that disruption of each of the electric fields of each of the electrodes 16 provides a total change of capacitance to the controller 20 to calculate the status of the seating assembly 12. The controller 20 may also communicate the status of the seating assembly 12 to a vehicle control sub-system 22.

The array 14 of electrodes 16 arranged in the back 18 of the seating assembly 12 provides a greater range of occupant movement data. For example, detecting conductivity of an occupant interaction with an electric field across the array 14 allows the controller 20 to provide occupant movement data across the back 18 of the seating assembly and indicate occupant movement data based on the interaction between an occupant and an electric field generated using the array 14 of the electrodes 16. Stated differently, the controller 20 may be able to indicate and output statuses of the seating assembly 12, in which the statuses are indicative of positions of the occupant relative to the back 18 of the seating assembly 12.

The controller 20 may output different statuses of the seating assembly 12 to different vehicle control subsystems 22. For example, the controller 20 may provide an airbag control system (not shown), a first status of the vehicle seating assembly 12, and a head-up control system (not shown), a second status of the vehicle seating assembly 12. The controller 20 may output commands to the airbag control system (not shown) indicating if an occupant is present in the seating assembly 12 to appropriately inflate an airbag (not shown). Likewise, the controller 20 may output commands to a head-up control system indicative of an occupant movement, such as, leaning forward, to indicate a drowsiness level of the occupant. The controller 20 may be able to communicate with a plurality of different control sub-systems 22 of the vehicle 10 to improve performance of the vehicle. 10, or an experience of occupant within the vehicle 10. The controller 20 may also be configured to output the same status of the vehicle seating assembly 12 to a variety of different vehicle control sub-systems 22.

Likewise, the controller 20 may be further configured to output a first status of the vehicle seating assembly 12 to a set of vehicle control sub-systems 22, and a second or third status to a different set of vehicle control sub-systems 22. Further, occupant movement data collected by the array 14 of the electrodes 16 may be stored in a memory (not shown) of the controller 20 to further provide a database of occupant movement data within the seating assembly 12. The memory of the controller may be any memory commonly used in the controller 20 to store information. As will be discussed in more detail below, the database may allow the controller 20 to distinguish between occupant preference for vehicle seating positions, occupant type, and individual occupant thresholds to accommodate multiple and different occupants of the seating assembly 12.

As will be described in more detail below, the array 14 of electrodes 16 improves vehicle performance by providing a more accurate depiction of an occupant moving within a seating assembly 12 while traveling in the vehicle 10. Occupant movement data may aid in performance of the vehicle 10 by providing automated preferences, such as, but not limited to, radio stations, seat positions, and climate settings. In at least one instance, the controller 20 determines the status of the seating assembly 12 based on comparing a change in capacitance between each of the electrodes 16 in the array 14 to find a total change of capacitance across the array 14, which can indicate an occupant seated in the seating assembly 12, rotating either left or right in the seating assembly 12, or if an occupant is leaning forward in the seating assembly 12.

Figure 2:
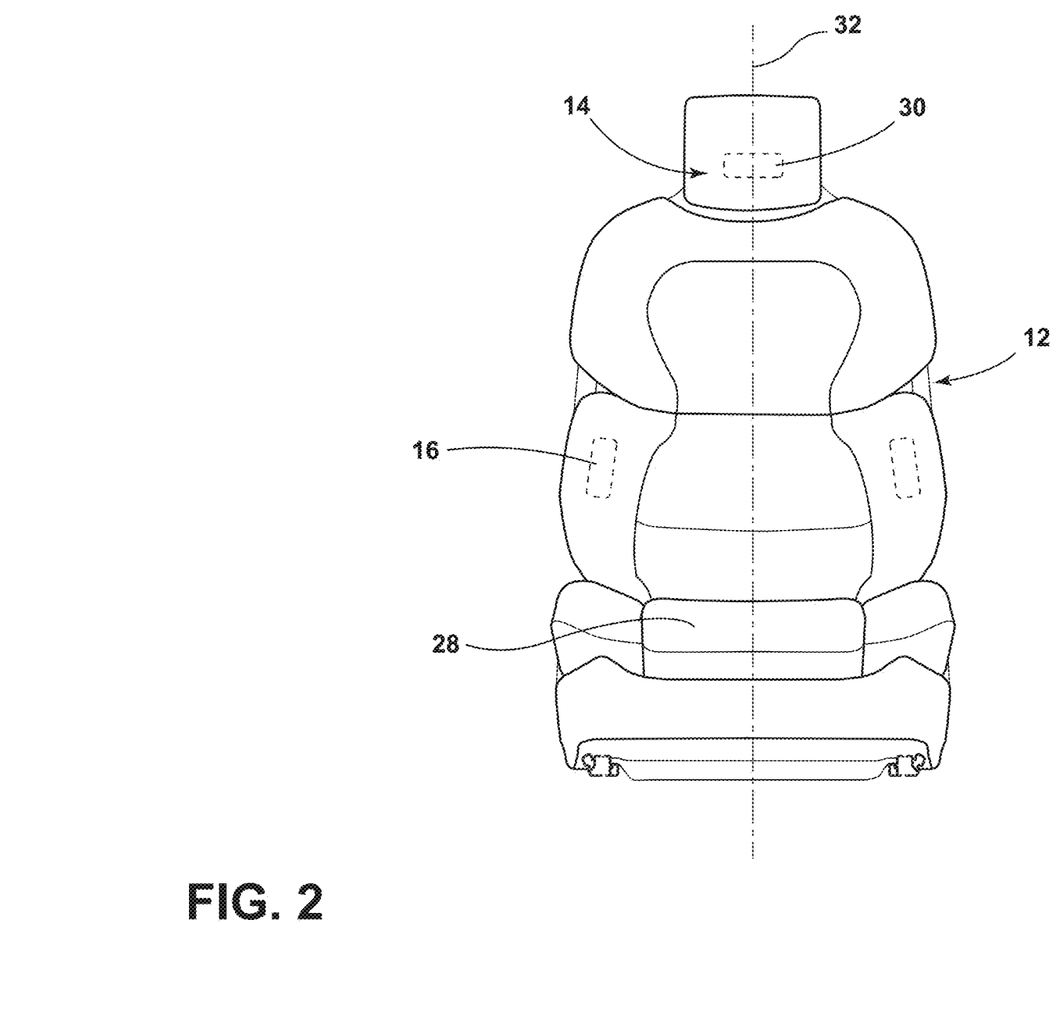
FIG. 2 is a schematic, front view of the vehicle seating assembly having the array of electrodes shown schematically in the vehicle seating assembly.
Figure 3:
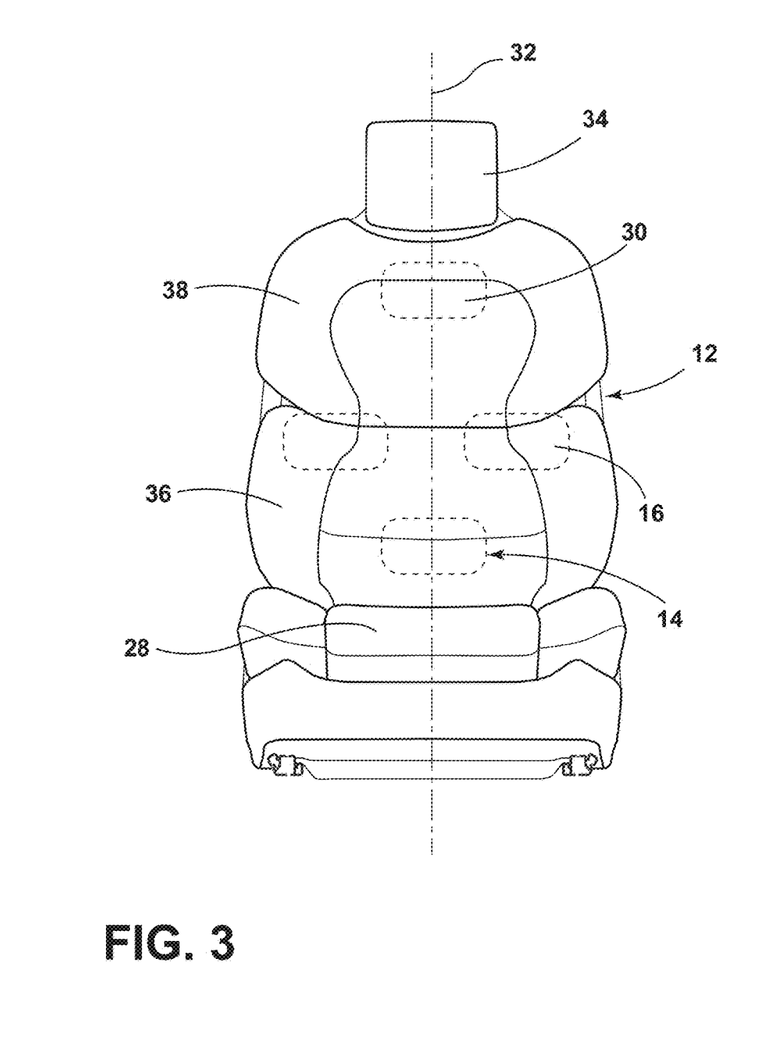
FIG. 3 is a schematic, front view of the vehicle seating assembly having an array of the electrodes according to a second embodiment of the present disclosure.
Figure 4:
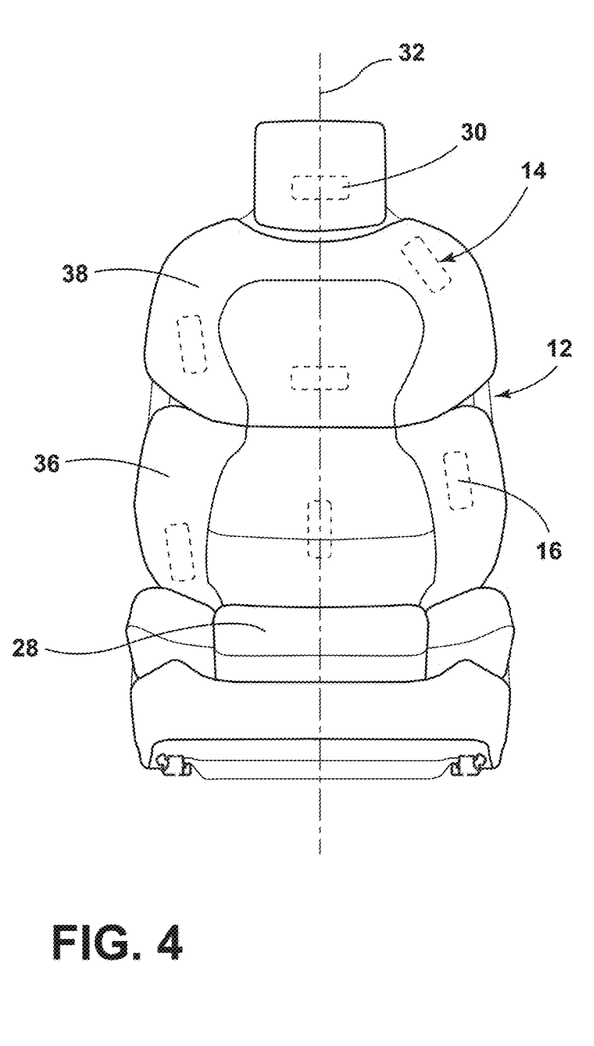
FIG. 4 is a schematic, front view of the vehicle seating assembly having an array of electrodes according to third embodiment of the present disclosure.

FIGS. 2-4 depict schematic, front views of the vehicle seating assembly 12 having different arrays 14 of the electrodes 16. The arrays 14 shown between FIGS. 2-4 differ in location of each individual electrode 16 in the array 14. Each array 14 in FIGS. 2-4 may be indicative of a different embodiment of the present disclosure. For example, while the embodiments shown through FIGS. 2-4 differ only in number and orientation of the electrodes 16 in the array 14 such that each embodiment depicted in FIGS. 2-4 detect a total change in capacitance from the electrodes 16 in the array 14, which is indicative of occupant movement in the seating assembly 12.

Referring to FIG. 2, specifically, a seating assembly 12, according to a first embodiment of the present disclosure, having at least two electrodes 16 is depicted. As shown in FIG. 2, the electrodes 16 may be lined along a centerline 32 of the seating assembly 12. For example, the array 14 may include a master electrode 30. In at least one instance, the master electrode 30 may have a surface area being greater than a surface area of each of the other electrodes 16 in the array 14. Having a greater surface area allows the master electrode 30 to provide a stronger electric field such that each of a first, second, third, and fourth status of the seating assembly 12 may be calculated by the controller 20. In at least one other instance, the master electrode 30 may have an applied voltage being greater than an applied voltage for each of the other electrodes 16 in the array 14 to provide a stronger electric field for the master electrode 30. While shown as aligned across the seating assembly centerline 32, each of the electrodes 16, including the master electrode 30, may be arranged in a way that is not symmetric across the seating assembly centerline 32. Likewise, each of the electrodes 16, including the master electrode 30, may be arranged at preset locations optimized on the seating assembly 12 to provide a better indication of occupant movement in the seating assembly 12. The plurality of electrodes 16 that comprise the array 14 may be connected in parallel to each other. The array 14 may be arranged such that a total change of capacitance of the electrodes 16 decreases as an occupant moves further away from the seating assembly 12. In a similar manner, the array 14 may be arranged on the seating assembly 12 such that a change in capacitance of the electrodes 16 increases as a distance between an occupant and the seating assembly 12 decreases.

FIG. 3 depicts the array 14 having at least four electrodes 16. Again, similar to FIG. 2 above, the plurality of electrodes 16 are depicted as being symmetrical across the seating assembly centerline 32. Again, this is merely exemplary. Each of the electrodes 16 in the array 14 depicted in FIG. 3 may also be disposed at preset positions (not shown) of the back 18 of the seating assembly 12, such as, for example, a headrest section 34, a back section 38, and a lumbar section 36 of the back 18 of the seating assembly 12. The array 14 of the plurality of electrodes 16 may also be disposed across each of the headrest section 34, back section 38, and lumbar section 36 being either symmetrical across the centerline 32, or having an even or uneven distribution in each of the headrest, back, and lumbar sections 34, 38, 36 on the seating assembly 12. The master electrode 30 from the plurality of electrodes 16 is shown in FIG. 3 as being the uppermost electrode 16 relative to the base 28 of the seating assembly 12. This is exemplary, and the master electrode 30 may be disposed at any location in the array 14 depicted in FIG. 3. Increasing the number of electrodes, as shown between FIGS. 2 and 3, provides greater detection strength of the array 14.

Referring to FIG. 4, specifically, the plurality of electrodes 16 are shown as asymmetric across the seating assembly centerline 32. Again, this is merely illustrative of a potential arrangement of electrodes 16 in the array 14. Again, increasing the number of electrodes 16 in the plurality of electrodes 16 that comprise the array 14 provides stronger signal characteristics to distinguish between occupant positions in the seating assembly 12. As shown in FIG. 4, the asymmetry of the array 14 of electrodes 16 may be optimized based on points that provide greater interaction between an occupant (not shown) and the electric field emitted by the plurality of electrodes 16 to increase signal strength. Additionally, the asymmetry of the array 14 of the plurality of electrodes 16 may differ in each of the headrest, back, and lumbar sections 34, 38, 36 in number, orientation, or type to provide optimized occupant movement data from the seating assembly 12.

As described above, FIGS. 2-4 depict various embodiments having differing numbers of positions of the electrodes 16. The number of electrodes 16 may be limited by packaging space in the back 18 of the seating assembly 12, as well as locations that provide lesser signal quality, such as, but not limited to, areas near metal structural components (not shown) of the seating assembly 12. Likewise, the number of electrodes 16 may further be limited by processing speed and power of the controller 20. For example, a greater number of electrodes 16 in the array 14 provides for greater computational requirements to determine occupant movement in the seating assembly 12. The plurality of electrodes 16 may include at least two capacitive sensors in the array 14. Additionally, or alternatively, the plurality of electrodes 16 may include inductive sensors such that an occupant (not shown) interacts with a magnetic field when a voltage is applied to flow current through the inductive sensors. The plurality of electrodes 16 may be used to determine a first, a second, a third, and a fourth position of an occupant in the seating assembly 12. In an instance using capacitive sensors as the electrodes 16, the electrodes 16 may be formed from an insulator layer disposed between two conductive layers (not shown). For example, a metal conductive layer may be deposited on either side of a glass substrate. Stated differently, an anode and a cathode are deposited on either side of a dielectric material to store charge. In this example, electrons are passed through the glass dielectric substrate between the metal layers to create a capacitor able to store a capacitance.

Figure 5A:
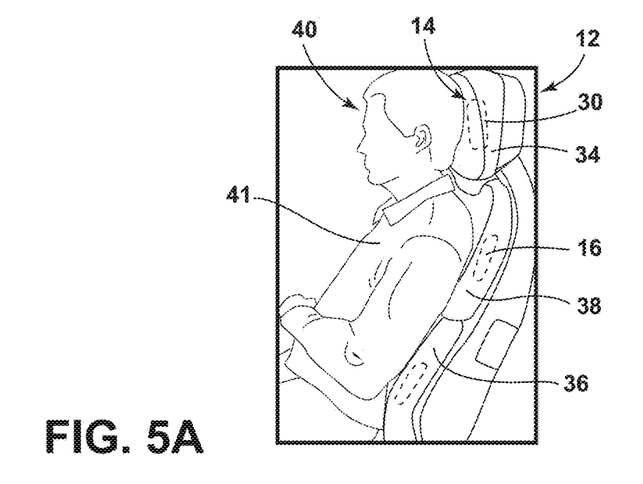
FIGS. 5A-5D are schematic, side views of an occupant moving within the seating assembly of the present disclosure.

FIGS. 5A-5D depict a side view of a vehicle seating assembly 12 with an occupant 40 moving between four different positions corresponding to a status of the vehicle seating assembly 12. FIG. 5A depicts the occupant 40 sitting in a normal position in the seating assembly 12. The normal position may correspond to the status, or the first status of the vehicle seating assembly 12. If an occupant 40 is sitting as depicted in FIG. 5A, a total change in capacitance across the array 14 may be greater than a first threshold. The total change of capacitance is greater than the first threshold when an occupant is sitting upright in the seating assembly 12 because a greater portion of the occupant 40 is interacting with the electric, or magnetic, field from the electrodes 16 in the array 14. Therefore, the first threshold may be indicative of an occupant 40 sitting on the base 28 with an upper body 41 against each of the headrest, back, and lumbar sections 34, 38, 36 of the seating assembly 12.

Figure 5B:
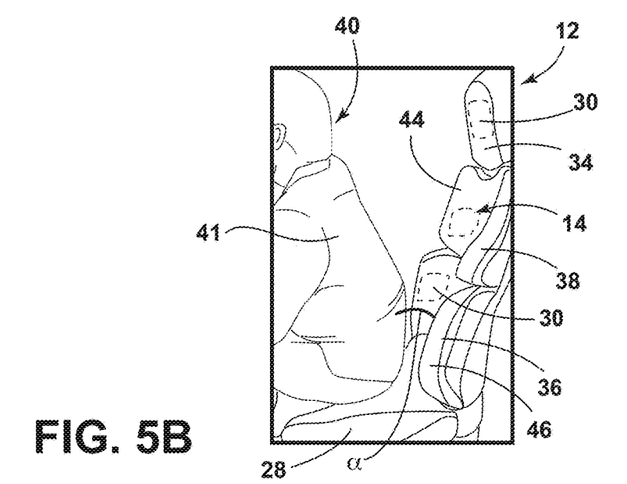

FIG. 5B depicts the occupant 40 as leaning forward toward a front portion (not shown) of the vehicle 10 and away from the back 18 of the seating assembly 12. Stated differently, FIG. 5B depicts the occupant 40 leaning toward the front portion of the vehicle 10 such that an angle α between the occupant and the back 18 of the seating assembly 12 increases. In this way, the occupant 40 interacts with an electrode 16 disposed in the lumbar section 36 of the seating assembly 12 more than electrodes 16 disposed in the headrest and back sections 34, 38 of the back 18 of the seating assembly 12. Therefore, if the master electrode 30 has a change in capacitance less than a second threshold and each of the other electrodes 16 have a change in capacitance being less than the first threshold, the controller 20 outputs a second status of the seating assembly 12 being indicative of the second position of the occupant 40. The second position depicted in FIG. 5B is consistent with an occupant leaning as described.

Figure 5C:
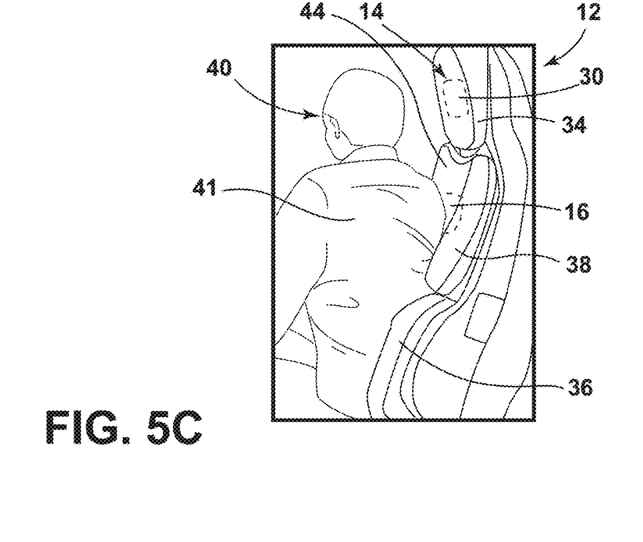

FIG. 5C depicts a side view of the vehicle seating assembly 12 showing the occupant 40 rotating to a side 44 of the seating assembly 12. In the instance depicted in FIG. 5C, the occupant 40 is shown rotating over the seating assembly centerline 32 toward a center of the vehicle 10. As shown in FIG. 5C, an upper body 41 of the occupant 40 is closer to the side 44 of the back 18 consistent with a direction of rotation of the occupant 40. Stated differently, the occupant 40 will create a greater change in capacitance in the electrodes 16 disposed on the side 44 in the direction of rotation of the occupant 40, than a change of capacitance in the electrodes 16 on the opposing side 46 opposite the direction of rotation of the occupant 40. Therefore, the change in capacitance of the electrodes on the opposing side 46 is less than the electrodes 16 disposed on the side 44 of the direction of rotation of the occupant 40 on the seating assembly 12.

Figure 5D:
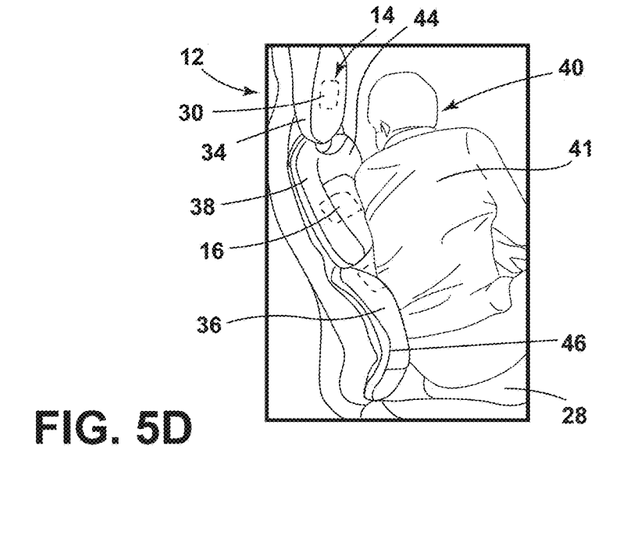

FIG. 5D depicts occupant rotation in the direction opposite that shown in FIG. 5C. FIGS. 5C-5D are mirror images of the seating assembly 12 that differ only in the direction of rotation of the occupant 40 being reversed. Therefore, operation and detection of occupant movement in the seating assembly 12 is the same. The controller 20, being responsive to at least one electrode 16 disposed on a first, or the, side 44 of the array 14 having a change in capacitance being greater than a change in capacitance of at least one electrode 16 disposed on a second, or the opposing, side 46 of the array 14, outputs occupant movement data being indicative of the third status of the seating assembly 12. Likewise, the controller 20, being responsive to at least one electrode 16 disposed on the first side 44 of the array 14 having a change in capacitance being less than a change in capacitance of at least one electrode 16 disposed on the second side 46 of the array 14, outputs occupant movement data being indicative of the fourth status of the seating assembly 12. In at least one embodiment, and as will be described in more detail below, the second threshold may be greater than the first threshold.

Figure 6:
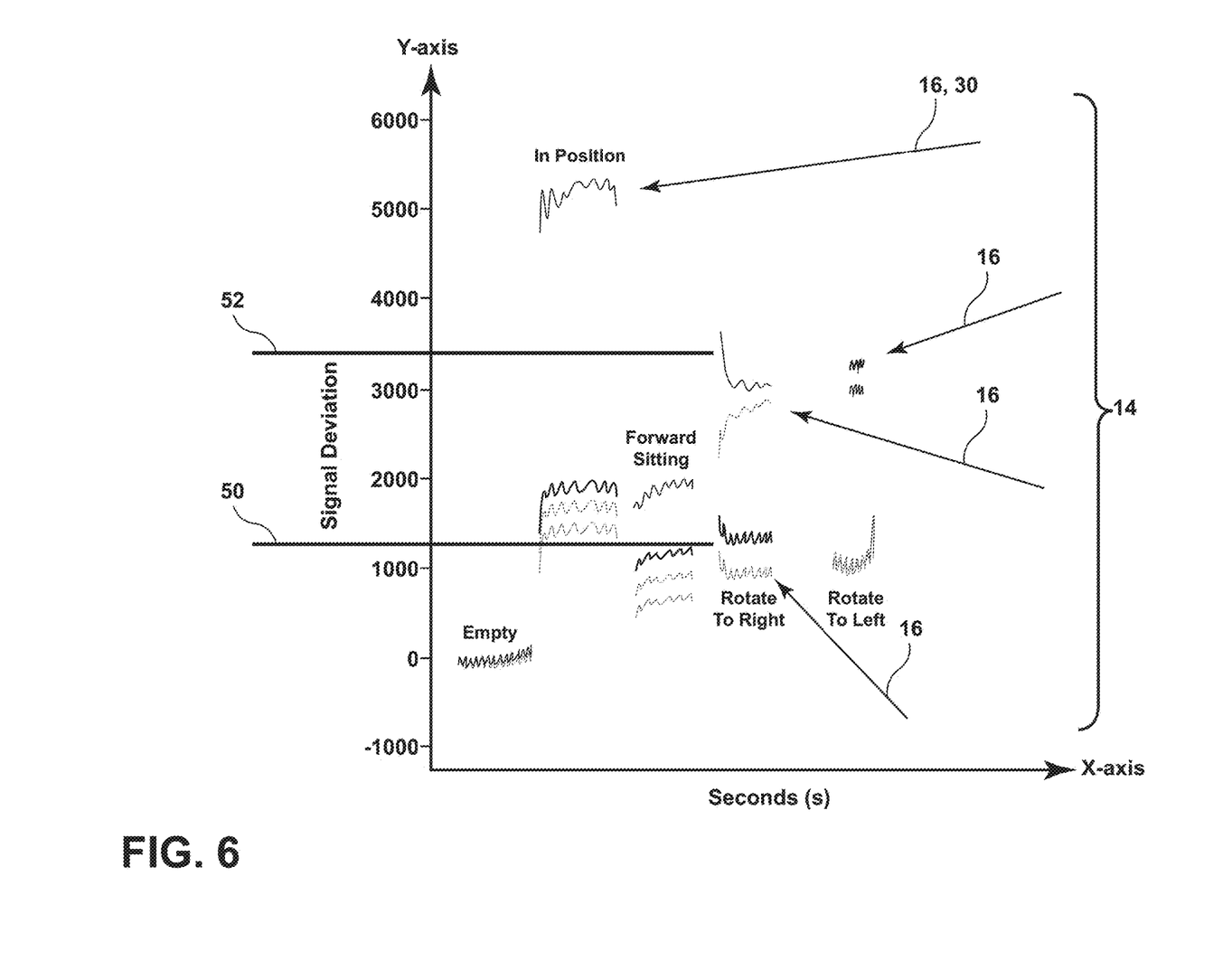
FIG. 6 is a graph showing first and second thresholds for determining occupant movement in the vehicle seating assembly.

FIG. 6 depicts a graph indicating signal thresholds from the array 14 of electrodes 16 to detect occupant movement data in the seating assembly 12. For example, FIG. 6 depicts a signal deviation, which is unitless, being a function that relates to a capacitance change along the y-axis and a time of the occupant in the seating assembly 12 in seconds along the x-axis. As is shown in FIG. 6, different positions of the occupant 40 in the vehicle seating assembly 12 may be determined with the first and second thresholds 50, 52. For example, in an embodiment in which the array 14 includes at least 4 electrodes 16, if each signal from each of the electrodes 16 is above the first threshold 50, the controller 20 outputs occupant movement data indicative of the status of the seat 12 shown graphically in FIG. 6, in which the first and second thresholds 50, 52 may be used in combination, or individually, to determine a position of an occupant in the seating assembly 12. While shown as two, individual, thresholds, a number of thresholds may vary based on a number of detected positions of an occupant in the seating assembly 12. Likewise, FIG. 6 depicts the master electrode 30 having a change in capacitance being less than the second threshold 52 and each of the other electrodes 16 having a change in capacitance being less than the first threshold 50 to indicate the second status of the seating assembly 12 to the controller 20.

Again, the second status of the seating assembly 12 may be indicative of an occupant 40 leaning toward a front portion of the vehicle 10, as described above. FIG. 6 also depicts rotation of the occupant 40 from each of the side 44 and the opposing side 46 of the seating assembly 12. Again, rotation to either of the sides 44, 46 of the seating assembly 12 provides a greater signal from the side 44 consistent with the direction of rotation of the occupant 40 than the opposing side 46. Therefore, FIG. 6 depicts that an electrode 16 disposed on the first side 44 of the array 14 having a change in capacitance being greater than a change in capacitance of an electrode 16 disposed on a second side 46 of the array 14 such that the controller 20 outputs occupant movement data indicative of the third status, or fourth status of the seating assembly 12. FIG. 6 provides a graphical representation of a change in capacitance of each electrode 16 in the array 14. In the embodiment depicted in FIG. 6, the array 14 includes at least four electrodes 16.

Figure 7:
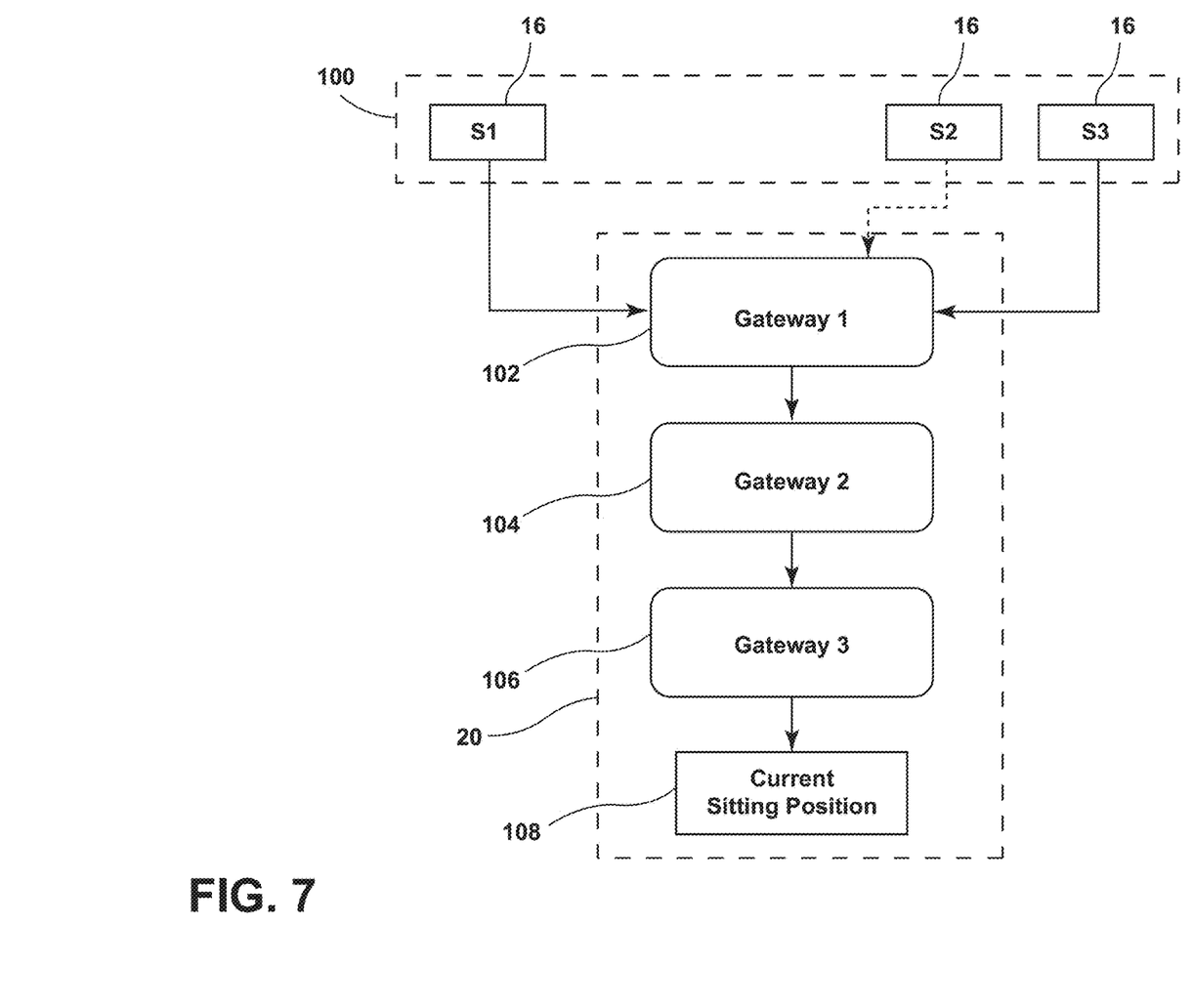
FIG. 7 is a flow diagram showing steps indicative of analyzing occupant movement data in the vehicle seating assembly using gateways to determine a status of the vehicle seating assembly.

FIG. 7 is a flowchart depicting signal processing steps such that the controller 20 is able to determine a position of the occupant 40. Specifically, FIG. 7 depicts a flow diagram indicative of gateways 102, 104, 106 stored in the controller 20 to determine a position of an occupant 40 and a status of the seating assembly 12. For example, each gateway 102, 104, 106 corresponds to a position of the occupant 40 in the seating assembly 12. While shown and described as using three gateways 102, 104, 106, a number of gateways 102, 104, 106 may vary based on detected positions. Stated differently, as the number of gateways 102, 104, 106 increases, the number of positions of the occupant 40 in the seating assembly 12 detected by the controller 20 also increases.

At 100, sensor signals are transmitted to a first gateway 102. The first gateway 102 may be designed to store a first classifier function, which is described in more detail below, that recognizes a pattern of each signal, shown in FIG. 6, for example, from each of the electrodes at 100. The controller 20 detects a status of the seating assembly 12 through the first gateway 102 by analyzing occupant movement data indicative of a first position of the occupant 40 in the seating assembly 12. Again, the signals from the electrodes 16 are analyzed at the first gateway 102 using a classifier function that analyzes the pattern of each signal against the first and second thresholds 50, 52, which will be described in more detail with reference to the remaining figures, to determine the first position. For example, if the classifier function stored on the first gateway 102 determines occupant movement data of the first position, the first gateway 102 instructs the controller 20 to output that the occupant 40 is in the first position. Each signal is indicative of a change of capacitance in the electrodes 16 due to an occupant 40 interacting with an electric field generated by the electrodes 16.

Likewise, second and third gateways 104, 106 may be designed to store a second and a third classifier function, respectively, in which each of the second and third classifier functions recognize a pattern of each signal, shown in FIG. 6, for example, from each of the electrodes at 100. The controller 20 detects a status of the seating assembly 12 through the second and third gateways 104, 106 by analyzing occupant movement data indicative of the second and third positions of the occupant 40 in the seating assembly 12. Again, the signals from the electrodes 16 are analyzed at the second and third gateways 104, 106 using the second and third classifier functions that analyze the pattern of each signal against the first and second thresholds 50, 52, to determine the second and third positions, respectively. For example, if the second classifier function stored on the second gateway 104 determines occupant movement data of the second position, the second gateway 104 instructs the controller 20 to output that the occupant 40 is in the second position. Similarly, if the third classifier function stored on the third gateway 106 determines occupant movement data indicative of the third position, the third gateway 106 instructs the controller 20 to output that the occupant 40 is in the third position.

After each of the sensor signals at 100 are analyzed through each of the gateways 102, 104, and 106, using classifier functions, the controller 20 outputs a calculated status of the seating assembly 12 at 108. Again, the status of the seating assembly 12 may be indicative of a sitting position at 108 of an occupant 40 in the seating assembly 12. Further, as indicated in FIG. 7, each of the sitting positions at 108 detected by the controller 20 requires a gateway having a classifier function to determine further sitting positions of the occupant 40 in the seating assembly 12. As described above, the seating assembly 12 may include more than three gateways 102, 104, 106, and, therefore, each additional gateway adds a further sitting position of the occupant 40 in the seating assembly 12 to accurately determine the status of the seating assembly 12. FIG. 7 depicts an exemplary instance in which three gateways 102, 104, and 106 are used to allow the controller 20 to output a status of the seating assembly 12 being indicative of a sitting position at 108 of an occupant 40 in the seating assembly 12. Again, the controller 20 may output the status of the seating assembly 12 to other vehicle control sub-systems 22.

Figure 8:
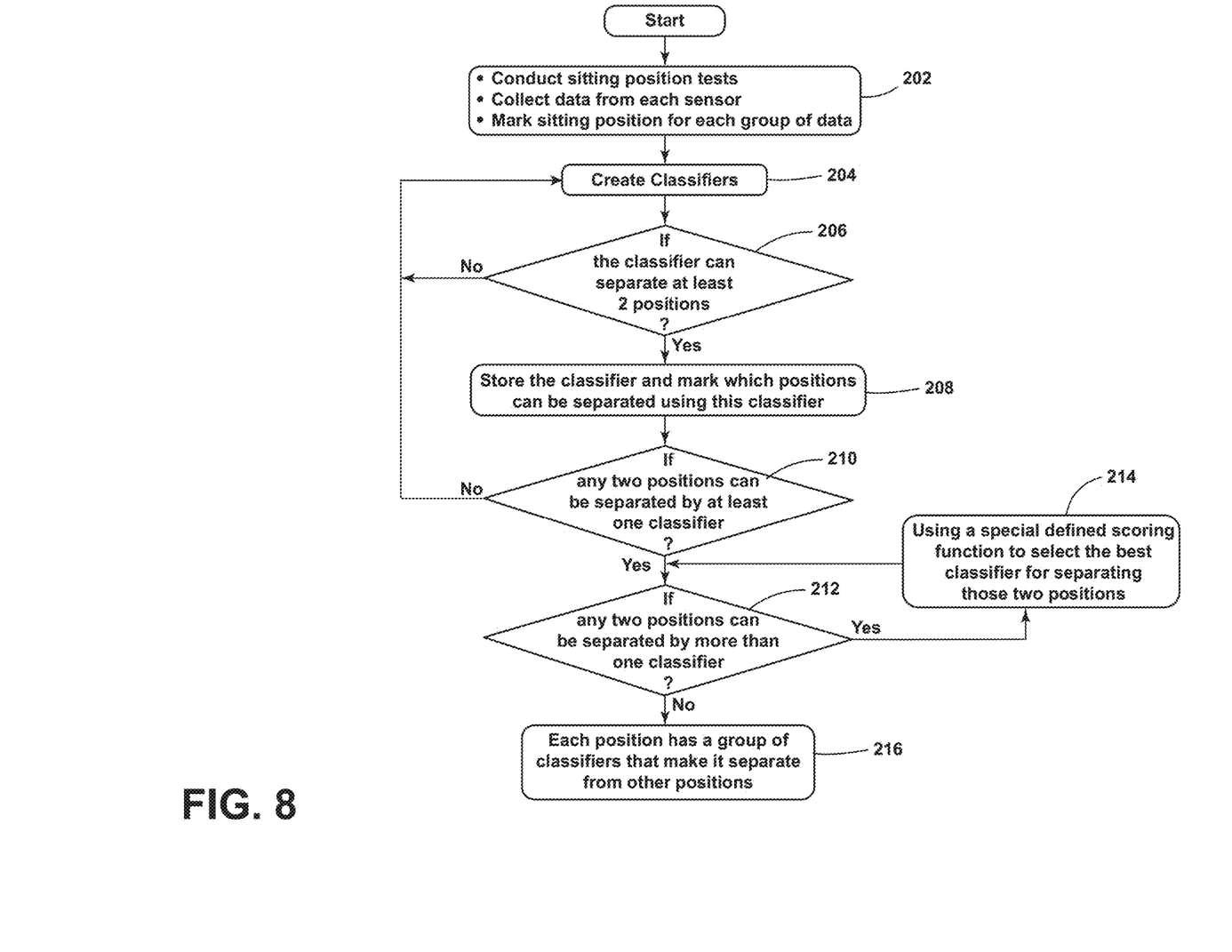
FIG. 8 is a flowchart showing control logic for using classifier functions to determine the status of the seating assembly of the present disclosure.

FIG. 8 depicts the control logic flow diagram for the each gateway, shown in FIG. 7, used by the controller 20 to calculate a status of the seating assembly 12, in which the status is indicative of a position of the occupant 40 within the seating assembly 12. Specifically, FIG. 8 depicts control logic for each of the classifier functions stored in each of the gateways 102, 104, 106 that analyze the pattern of each signal from each electrode 16 to determine the position of the occupant, and the status of the seating assembly 12. Each classifier function may be pre-defined and stored in each of the gateways on the controller 20. For example, each position is associated with a pattern of each signal from the electrodes 16 and the patterns that define each position are segregated by the classifier functions based on preexisting occupant movement data. However, the classifier functions may be stored directly on the controller 20, such as with machine learning applications, in which the controller 20 stores each calculated sitting position to a database (not shown), or communicates with a cloud server (not shown) to compare the pattern of each signal detected by the electrodes.

At 202, the classifier function is calibrated by using preexisting occupant movement data. Calibration of the classifier function at 202 may include conducting sitting position tests on the seating assembly 12, collecting data for each of the electrodes 16, and marking a position for each of the signals in the pattern. Calibration at 202 of each of the classifier functions allows the controller 20 to further distinguish between each status and sitting position of the seating assembly 12, which is indicative of occupant movement data from each of the electrodes 16 in the seating assembly 12. At 204, the classifier functions are created based on the calibration at 202 for occupant movement data across each of the electrodes 16. The controller 20 relies on the gateways 102, 104, 105 to have the classifier functions created at 204 to separate occupant movement data from each of the electrodes 16 classifier functions. Again, each of the classifier functions created at 204 may be associated with each of the gateways 102, 104, 106 described in FIG. 7.

At 206, the classifier functions may be stored in an associated gateway if the classifier function created at 204 is sufficient to segregate occupant movement data from each of the electrodes 16 into at least two positions of the occupant 40 in the seating assembly 12. If the classifier function created at 204 is not sufficient to segregate occupant movement data for each of the electrodes 16 into at least two positions of the occupant 40 in the seating assembly 12 at 206, additional classifier functions are created at 204. If at 206, the classifier function created at 204 is sufficient to segregate occupant movement data from each of the electrodes 16 into at least two positions of the occupant 40 in the seating assembly 12, the classifier function is stored in an associated gateway and marks separate positions of the occupant 40 in the seating assembly 12 in the associated gateway at 208. At 210 and 212, if the at least two positions of the occupant 40 in the seating assembly 12 are segregated using a single classifier function, and, by more than a single classifier function, the classifier function may be associated with a gateway stored on the controller 20.

If at 210, a single classifier function does not separate the at least two positions of the occupant 40 in the seating assembly 12, a further classifier function is created at 204. If the signals from the electrodes 16 are segregated by the further classifier into at least two positions at 206, the classifier functions are associated with a gateway, and the positions of the occupant 40 in the seating assembly 12 are marked and separated with the classifier function at 208. If at 210, a single classifier function does separate the at least two positions of the occupant 40 in the seating assembly 12, the at least two positions may not be separated by more than the single classifier function at 212 to be associated with a gateway. At 212, if the at least two positions of the occupant 40 in the seating assembly 12 are separated using more than one classifier function at 212, a pre-defined scoring function is used, at 214, to select an appropriate classifier function of the more than one classifier function to separate the at least two positions of the occupant 40 in seating assembly 12. After selection, via the pre-defined scoring function at 214, of the appropriate classifier function, the at least two positions of the occupant 40 in the seating assembly 12 may be separated by more than one classifier function at 212. Therefore, if, at 212, the controller 20 determines that the at least two positions of the occupant 40 in the seating assembly 12 cannot be separated by more than a single classifier function, the classifier function is associated with a gateway to analyze the signal pattern, as previously described, to instruct the controller 20 to output a status of the seating assembly 12. Again, the status is indicative of occupant movement data that defines a position of the occupant 40 in the vehicle seating assembly 12.

The logic flow depicted in FIG. 8 allows the controller 20 to determine a status of the seating assembly 12 using occupant movement data indicative of a position of an occupant 40 in the seating assembly 12. The controller 20 uses dedicated gateways 102, 104, 106 having associated classifier functions to analyze different signal patterns from each of the plurality of electrodes 16 to recognize and transmit different statuses of the seating assembly 12, in which the statuses are indicative of different sitting positions of an occupant 40 in the seating assembly 12. The controller 20 may be configured to transmit the status of the seating assembly 12 in milliseconds, or substantially real-time using the seating assembly 12 described.

It is to be understood that variations and modifications can be made on the aforementioned structure without departing from the concepts of the present invention, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seating assembly, comprising:
   a seat including a back having an array of at least two electrodes arranged in the back such that a master electrode has an electric field being greater than an electric field of each of the other electrodes within the array to detect a total change in capacitance from the array;
   a controller that outputs occupant movement data indicative of a first status of the seat if the total change in capacitance is greater than a first threshold;
   wherein the controller outputs occupant movement data being indicative of a second status of the seat if the master electrode has a change in capacitance being less than a second threshold and each of the other electrodes has a change in capacitance being less than the first threshold; and
   wherein the first status of the seat is indicative of the master electrode having a change in capacitance being greater than the second threshold and each of the other electrodes having a change in capacitance being greater than the first threshold.

2. The vehicle seating assembly of claim 1, wherein the controller transmits the status to a vehicle control subsystem.

3. The vehicle seating assembly of claim 1, wherein the controller outputs occupant movement data being indicative of a third status of the seat if at least one electrode disposed on a first side of the array of the plurality of electrodes has a change in capacitance being greater than a change in capacitance of at least one electrode disposed on a second side of the array of the plurality of electrodes.

4. The vehicle seating assembly of claim 3, wherein the controller outputs occupant movement data being indicative of a fourth status of the seat if at least one electrode disposed on a first side of the array of the plurality of electrodes has a change in capacitance being less than a change in capacitance of at least one electrode disposed on a second side of the array of the plurality of electrodes.

5. A vehicle comprising:
   a seating assembly having a plurality of electrodes disposed in an array, and including a master electrode having an electric field being greater than each of the other electrodes in the plurality of electrodes; and a controller that outputs occupant movement data indicative of a first status of the seat if a change in capacitance calculated from the master electrode is greater than a second threshold and each of the other electrodes in the plurality of electrodes has a change in capacitance greater than a first threshold;

wherein the plurality of electrodes is arranged symmetrically across a seating assembly centerline; and wherein the controller outputs occupant movement data being indicative of a second status of the seat if the master electrode has a change in capacitance being less than the second threshold and each of the other electrodes has a change in capacitance being less than the first threshold.

6. The vehicle as claimed in claim 5, wherein the controller outputs occupant movement data being indicative of a third status of the seat if at least one electrode disposed on a first side of the array of the plurality of electrodes has a change in capacitance being greater than a change in capacitance of at least one electrode disposed on a second side of the array of the plurality of electrodes.

7. The vehicle as claimed in claim 5, wherein the controller outputs occupant movement data being indicative of a fourth status of the seat if at least one electrode disposed on a first side of the array of the plurality of electrodes has a change in capacitance being less than a change in capacitance of at least one electrode disposed on a second side of the array of the plurality of electrodes.

8. The vehicle as claimed in claim 7, wherein the first and second sides of the array are oppositely orientated across a vertical centerline.

9. The vehicle as claimed in claim 5, wherein the plurality of electrodes is arranged symmetrically across a seat centerline.

10. A method for controlling a vehicle sub-system comprising:

receiving occupant movement data from a seating assembly having a plurality of electrodes including a master electrode having an electric field being greater than each of the other electrodes in the plurality of electrodes being disposed in an array in a back portion of the seating assembly;

calculating, via a controller, a status of the seating assembly based on a change in capacitance calculated from the master electrode being greater than a second threshold and a change in capacitance from each of the other electrodes in the plurality of electrodes being greater than a first threshold; and calculating, via the controller, responsive to the master electrode having a change in capacitance being less than the second threshold and each of the other electrodes having a change in capacitance being less than the first threshold, occupant movement data being indicative of a second status of the seating assembly; and transmitting the status of the seating assembly to a vehicle control sub-system.

11. The method of claim 10 further comprising calculating, via the controller, responsive to at least one electrode disposed on a first side of the array of the plurality of electrodes having a change in capacitance being greater than a change in capacitance of at least one electrode disposed on a second side of the array of the plurality of electrodes, occupant movement data being indicative of a third status of the seating assembly.

12. The method of claim 10 further comprising calculating, via the controller, responsive to at least one electrode disposed on a first side of the array of the plurality of electrodes having a change in capacitance being less than a change in capacitance of at least one electrode disposed on a second side of the array of the plurality of electrodes, occupant movement data being indicative of a fourth status of the seat.

13. The method of claim 10 further comprising transmitting the status of the seating assembly to at least one additional vehicle control sub-system.

14. The method of claim 10, wherein the second threshold is greater than the first threshold.

* * * * *